United States Patent [19]

Thorsheim

[11] 4,145,882

[45] Mar. 27, 1979

[54] WAVE POWER GENERATOR

[76] Inventor: Ivar Thorsheim, Kalkfjellet 15, 1370 Asker, Norway

[21] Appl. No.: 860,555

[22] Filed: Dec. 14, 1977

[51] Int. Cl.² ............................ F15B 1/00; E02B 9/00; F03B 13/12
[52] U.S. Cl. ...................................... 60/325; 60/398; 290/53; 405/76
[58] Field of Search ...................... 60/325, 398; 61/20; 290/42, 53; 417/100, 330

[56] References Cited

U.S. PATENT DOCUMENTS

| | | | |
|---|---|---|---|
| 3,353,787 | 11/1967 | Semo | 60/325 |
| 3,989,951 | 11/1976 | Lesster et al. | 417/330 X |

FOREIGN PATENT DOCUMENTS 2289763  10/1974  France ........................................ 60/398

*Primary Examiner*—Edgar W. Geoghegan
*Attorney, Agent, or Firm*—Watson, Cole, Grindle & Watson

[57] ABSTRACT

A device for deriving power from the energy of moving water waves includes a bag of flexible, impervious and inelastic material filled with a liquid to at least half but less than full capacity thereof and being adapted for submergence below the surface of a body of water parallel to the principle direction of movement of the waves. A passageway element having open opposite ends is in communication with the interior of the bag and forms together therewith a closed circuit flow as the liquid is channeled between opposite ends of the bag in a direction opposite the principle direction of movement of the waves. An electric power generator with turbine blades thereon is disposed between opposite ends of the passageway element. The liquid within the bag is subjected to an undulating motion between its ends in response to the movement of the waves in such direction as the weight of the waves creates corresponding currents of liquid within the bag, the currents of liquid thereby operating the turbine blades upon the movement of the liquid waves between the ends of the passageway element.

5 Claims, 4 Drawing Figures

U.S. Patent  Mar. 27, 1979  4,145,882
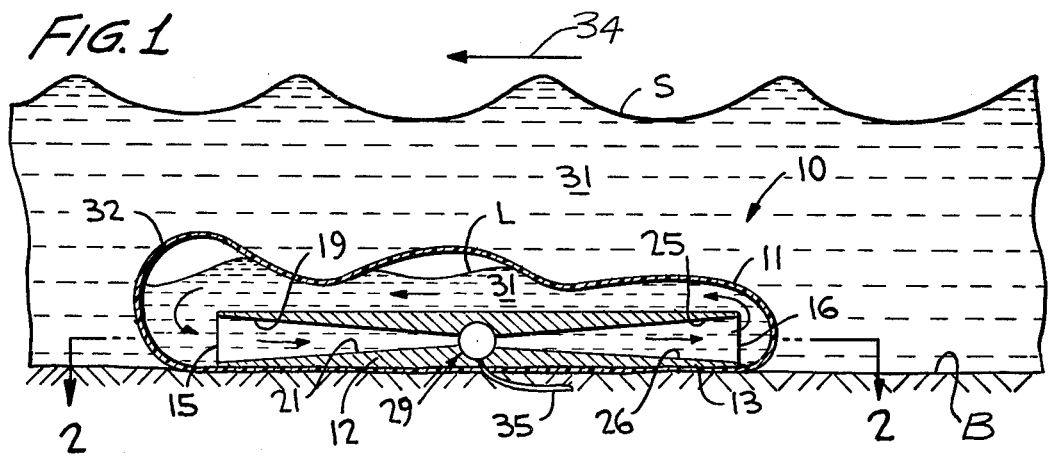
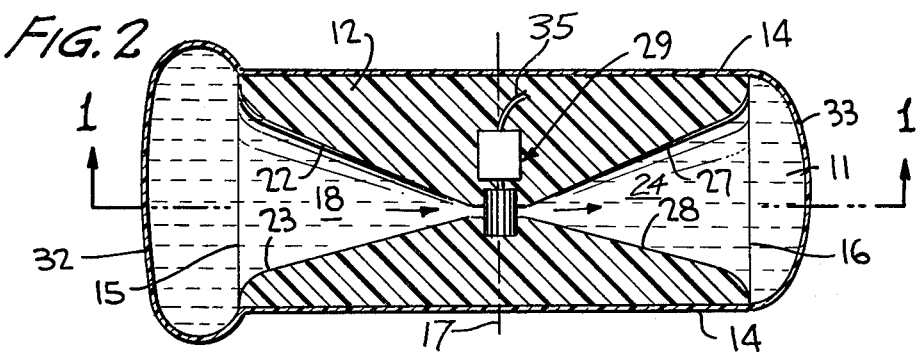
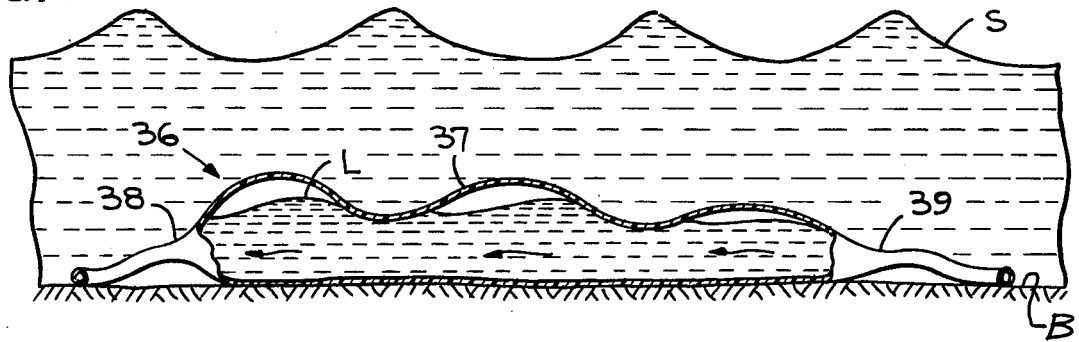
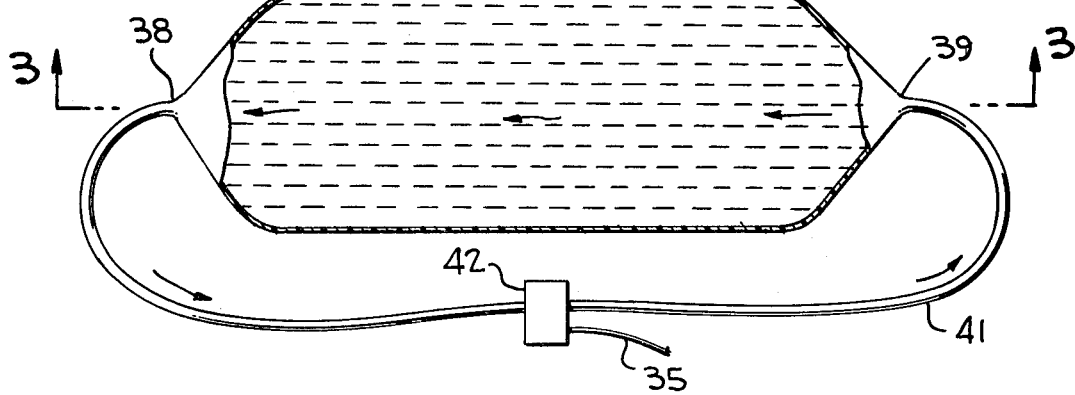

WAVE POWER GENERATOR

BACKGROUND OF THE INVENTION

This invention relates generally to a device for generating power from moving water waves, and more particularly to such a device which includes a quantity of liquid caused to be moved as waves within the device for the generation of power.

Devices have been developed in the past for the generation of power from ocean waves and other moving water wave action, except that such devices are typically of such massive and complex shoreline or open sea constructions as to discourage their use by smaller power consumers especially in remote areas, and furthermore present obstructions to seashore activities, fisheries and boat traffic. Besides, such prior art devices are costly to construct and maintain, and those at the shoreline are affected by the changing tides.

SUMMARY OF THE INVENTION

It is therefore an object of the present invention to provide a device for deriving power from the energy of moving waves in a simple, efficient and economical manner without the need of a shoreline installation.

Another object of this invention is to provide such a device which may be mounted on the bottom of a body of water, such as an ocean, lake, river or stream, or which may be otherwise submerged a predetermined distance below the water so as to take full advantage of the forward moving mass of water and the weight of such mass directed downwardly.

A further object of the invention is to provide such a device filled with liquid induced by the moving water to flow in a closed circuit within a bag for generating electric power.

A still further object of the present invention is to provide such a device wherein the bag is of flexible, impervious and inelastic material having means in communication with the interior thereof through which the liquid is channeled during its path of movement. The moving water creates corresponding waves of liquid within the bag so as to thereby operate turbine blades disposed in the channeling means.

Other objects, advantages and novel features of the invention will become more apparent from the following detailed description when taken in conjunction with the accompanying drawings.

BRIEF DESCRIPTION OF THE DRAWINGS

FIG. 1 is a sectional view in side elevation of one embodiment of the device according to the invention and taken substantially along line 1—1 of FIG. 2;

FIG. 2 is a sectional view in top plan of the device of FIG. 1 taken substantially along line 2—2 thereof;

FIG. 3 is a sectional view in side elevation of another embodiment of the device according to the invention, taken substantially along line 3—3 of FIG. 4; and FIG. 4 is a top plan view of the device of FIG. 3.

DETAILED DESCRIPTION OF THE INVENTION

The power of moving waves present in bodies of water such as an ocean, lake, river, stream, and the like, consists of the inertia of the forward moving mass of water plus the weight of such mass directed downwardly, the speed, and the revolving current within the wave.

The wave action generator according to the invention utilizes the weight of the surface wave directed downwardly for the purpose of creating a corresponding wave within a large sack or bag containing a liquid and submerged in the open sea or lying at the bottom in shallow water of an ocean, river, lake, stream, or the like.

Turning now to the drawings wherein like reference characters refer to like and corresponding parts throughout the several views, FIGS. 1 and 2 illustrate one embodiment of the device according to the invention shown at 10 and including a closed bag 11 of flexible, impervious and inelastic material such as canvas lined with plastic or rubber, an unstretchable rubber or rubberized material, an unstretchable plastic material, or the like. An elongated passageway element 12 is disposed within the bag and is secured thereto at its bottom and opposing side surfaces 13 and 14 so as to effect open communication between the interior of the bag and only open ends 15 and 16 of element 12. Otherwise, element 12 may form the base of the bag and be secured thereto along corner, top, side and bottom end edges to accomplish basically the same construction as shown, without departing from the scope of the present invention.

Passageway element 12 is open between its opposite ends, and is symmetrical about its central transverse axis 17. A funnel 18 is defined in element 12 between end 15 and axis 17, and is formed by walls 19, 21, 22 and 23 converging toward the central axis. A connecting funnel 24 is also formed by walls 25, 26, 27 and 28 converging toward axis 17 from end wall 16. The vanes or blades of a turbine driving an electric generator are disposed at the constriction between funnels at axis 17 so as to be in the open path between ends 15 and 16.

The bag is filled with a liquid L, which may be ocean water, so as to occupy at least one-half but less than full capacity of the volume of the bag and the attached passageway element. During the filling of the bag, through some suitable opening such as a plug (not shown), the formation of air pockets within the bag must be avoided (as much as possible). Device 10 is shown supported on bottom B beneath water surface S of the ocean, lake, river, stream or the like. The passageway element is of a rigid material although it may be made of a suitable type of buoyant but nevertheless rigid material so as to cause device 10 to float beneath surface S of the water at a predetermined distance sufficient to take advantage of the wave action. And, in order to maintain a pathway 31 unobstructed above element 12, the element would need to be anchored to the water's bottom. Otherwise, a non-buoyant element 12 could be supported by lines (not shown) connected to buoys afloat on the water's surface S.

In operation, liquid L within the bag is subjected to an undulating motion between opposite ends 32 and 33 of the bag in response to the waves moving in the direction shown by arrow 34. Device 10 and its element 12 are disposed substantially parallel to the principle direction of wave movement to take full advantage of the wave's motion. Such an undulating motion is caused as the weight of the moving waves creates corresponding waves of liquid within the bag, such waves of liquid moving within pathway 31 in the same direction 34 as the water waves so as to cause end 32 of the bag to bulge outwardly as the wave reverses its flow into open end 15 of element 12 and through funnel 18. The turbine blades are operated by the liquid passing therethrough during its movement at increasing speed along funnel 18. The generated electric power may then be taken off from power cable 35. The moving liquid thereafter exits through end 16 and the cycle is repeated as a closed circuit flow within the bag. The waves of liquid L in the bag are induced by the water wave action for movement in the same direction 34, the liquid flow causing a positive pressure in funnel 18 and a sub-pressure in funnel 24 during its return movement through element 12. The length of device 10 should be equal to at least three normal water wave lengths in order that an accumulating effect may be set up. The wave formation of the surface wave will be repeated approximately in the bag in a manner wherein the surface maximum wave weight corresponds with the valley of the liquid wave inside the bag.

If necessary, the water wave formation may be changed by some artificial means such as a small obstruction placed upstream of the device when located in a shallow stream. The altered wave is thus available for inducing a corresponding wave of liquid in the bag.

If the wave direction is opposite that shown by arrow 34, the movement of the liquid through the passageway element 12 will be from open end 16 through the turbine blades so as to exit through end 15 in a direction opposite that shown in FIGS. 1 and 2. Thus, funnel 24 is for accelerating the liquid flow similarly as described with reference to funnel 18, and the turbine blades are operated in a manner similar to that described above except that the liquid flow through element 12 is from end 16 through end 15.

A device generally designated 36 illustrates another embodiment according to the invention in FIGS. 3 and 4. This device is designed especially for shallow water locations since it does not include a passageway element such as 12 of FIG. 1 and may be made of buoyant material. Device 36 comprises a tubular bag 37 of a similar material described for that of bag 11, bag 37 resting on bottom B in relatively shallow waters. Bag 37 is filled with a liquid L, which may be sea water, to at least half but less than full capacity thereof. The bag is open ended as at 38 and 39, and an elongated hose 41 is connected at and in open communication with these open ends. Hose 44 is of flexible but incompressible material, and a waterproof turbine driving an electric generator 42 is associated with the hose as its turbine blades are in open communication with the inside of the tube. The operation of the turbine by the induced wave action of the liquid in the bag is the same as that described with reference to the first embodiment. The waves of liquid thus move through the hollow tube in the direction of the arrows of FIG. 4 as the moving water waves travel in their forward direction shown by arrow 43 in FIG. 3. Otherwise, the liquid in tube 41 will move in an opposite direction when the forward water wave direction is opposite that of arrow 43. As in the first embodiment, the liquid L moves in a closed circuit fashion between ends 38 and 39 counterclockwise or clockwise, when viewing FIG. 4, depending on the principle direction of movement of the water wave. Likewise, device 36 should be as long as at least three water wave lengths, and should be oriented, as nearly as possible, parallel to the principle direction of movement of the water wave.

From the foregoing it can be seen that a wave power generator has been devised which utilizes water wave action for inducing a corresponding wave action into the liquid contained within a flexible bag. The device is invisible in open sea, does not obstruct seashore activities, or surface traffic. It is simple and economical to manufacture and efficient to operate and to be maintained. Also, it may be easily transported on land and at sea and simply placed in its intended position at sea.

Obviously, many modifications and variations of the present invention are made possible in the light of the above teachings. It is therefore to be understood that within the scope of the appended claims the invention may be practiced otherwise than as specifically described.

I claim:

1. A device for deriving power from the energy of water waves, comprising, a bag of flexible, impervious and inelastic material filled with a liquid to at least half but less than full capacity thereof, said bag being adapted for submergence below the surface of a body of moving water such as an ocean, lake, river or stream, an element having open opposite ends and a passageway between said ends, said element being in open communication with the interior of said bag for channeling the liquid between opposite ends of said bag in a direction opposite a principle direction of movement of the waves, said element being adapted to lie parallel to the principle direction of movement of the water waves and said bag having a length spanning at least three water waves, a power generator with turbine blades thereon being disposed between said opposite ends of said element, whereby the liquid within said bag is subjected to an undulating motion between said ends thereof in response to the movement of the moving water waves in its principle direction as the weight of the moving waves creates corresponding waves of liquid moving in said principle direction within said bag, the waves of liquid thereby operating said turbine blades upon the movement of the liquid waves between said open opposite ends of said element.

2. The device according to claim 1, wherein said element is of rigid material and said passageway thereof is defined by walls converging from one of said ends thereof to said generator thereby forming a funnel through which the liquid waves pass at increasing speed upon movement from said one end through said blades to thereby operate same for the generation of power upon movement of the water waves in the principle direction.

3. The device according to claim 1, wherein said element is of rigid material and said passageway thereof is defined by walls converging from the other of said open ends to said generator thereby forming a funnel through which the liquid waves pass at increasing speed upon movement from said other end through said blades to thereby operate same for the generation of power upon movement of the water waves in a principle direction opposite the first-mentioned direction.

4. The device according to claim 1, wherein said element is disposed within said bag and is secured to a base thereof so as to define a pathway between the top of said bag and the upper surface of said element along which the waves of liquid travel in said principle direction of movement of the water waves.

5. The device according to claim 1, wherein said bag comprises an elongated tube with said opposite ends thereof being open, said element comprising an elongated hose of flexible but incompressible material interconnecting and in open communication with said opposite ends of said tube.

* * * * *